US012676515B2

(12) United States Patent
Uematsu et al.

(10) Patent No.: US 12,676,515 B2
(45) Date of Patent: Jul. 7, 2026

(54) ROTARY ELECTRIC MACHINE

(71) Applicant: MEIDENSHA CORPORATION, Tokyo (JP)

(72) Inventors: Taku Uematsu, Tokyo (JP); Shigeo Sakurai, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 19/114,927

(22) PCT Filed: Aug. 30, 2023

(86) PCT No.: PCT/JP2023/031562
§ 371 (c)(1),
(2) Date: Mar. 25, 2025

(87) PCT Pub. No.: WO2024/070454
PCT Pub. Date: Apr. 4, 2024

(65) Prior Publication Data
US 2025/0260273 A1 Aug. 14, 2025

(30) Foreign Application Priority Data
Sep. 26, 2022 (JP) .................................. 2022-152672

(51) Int. Cl.
*H02K 1/16* (2006.01)
*H02K 3/24* (2006.01)
(Continued)

(52) U.S. Cl.
CPC .............. *H02K 1/165* (2013.01); *H02K 3/24* (2013.01); *H02K 3/30* (2013.01); *H02K 3/345* (2013.01)

(58) Field of Classification Search
CPC ............................... H02K 3/487; H02K 15/13
(Continued)

(56) References Cited

U.S. PATENT DOCUMENTS

| | | | |
|---|---|---|---|
| 3,641,378 A | 2/1972 | Lehenaff | |
| 2006/0290225 A1* | 12/2006 | Mipo ........................ | H02K 1/16 |
| | | | 310/216.069 |
| 2024/0136873 A1* | 4/2024 | Tokuhisa ............... | H02K 15/12 |

FOREIGN PATENT DOCUMENTS

| | | |
|---|---|---|
| DE | 10 2020 117 267 A1 | 5/2022 |
| EP | 2 645 542 A2 | 10/2013 |

(Continued)

OTHER PUBLICATIONS

WO-2024028122-A1 machine translation (Year: 2024).*

*Primary Examiner* — Oluseye Iwarere
*Assistant Examiner* — Minki Chang
(74) *Attorney, Agent, or Firm* — Foley & Lardner LLP

(57) ABSTRACT

A rotary electric machine comprises a rotor and a stator, wherein one of the rotor and the stator includes: a groove portion that is formed on a circumferential surface facing the other of the rotor and the stator and extends in a direction that intersects with a circumferential direction, and a covering portion made of resin that covers the groove portion. The groove portion includes a retention portion that is formed such that a groove width at a second position is wider than a groove width at a first position, wherein the second position is separated in a radial direction from an opening farther than the first position. The retention portion is configured so as to prevent removal of the covering portion by engaging with resin material that is filled in the groove portion.

8 Claims, 3 Drawing Sheets

(51) Int. Cl.
    *H02K 3/30*        (2006.01)
    *H02K 3/34*        (2006.01)

(58) Field of Classification Search
    USPC ......................................................... 310/214
    See application file for complete search history.

(56)                References Cited

FOREIGN PATENT DOCUMENTS

| | | | |
|---|---|---|---|
| JP | S50-142102 U | 11/1975 | |
| JP | S51-166205 U | 12/1976 | |
| JP | 2003-250240 A | 9/2003 | |
| JP | 2013-208013 A | 10/2013 | |
| JP | 2016-185032 A | 10/2016 | |
| JP | 2018-133920 A | 8/2018 | |
| JP | 2018-174644 A | 11/2018 | |
| WO | WO-2020/174180 A1 | 9/2020 | |
| WO | WO-2024028122 A1 * | 2/2024 | ............. H02K 9/197 |

* cited by examiner

ROTARY ELECTRIC MACHINE

TECHNICAL FIELD

The present invention relates to a rotary electric machine.

BACKGROUND ART

Conventionally, windage loss, which is generated by frictional resistance between a rotor and air in the vicinity of the rotor, has been known as one of the mechanical losses of rotary electric machines. Windage loss becomes larger when there are irregularities in surface shapes of rotors and stators. For example, slots in stators for housing coils and grooves that are formed on surfaces of stators and rotors for reducing torque ripple become windage loss increasing factors by generating eddy flows during rotation of the rotor. For example, Patent Literature 1 proposes a configuration in which a covering layer made of resin that fills irregularities is formed on an inner peripheral side of a stator so as to flatten an inner peripheral surface of the stator for reducing windage loss of the rotary electric machine.

CITATION LIST

Patent Literature

Patent Literature 1: JP 2016-185032 A

SUMMARY OF INVENTION

Technical Problem

In a case in which windage loss is suppressed by forming a resin covering layer on the stator surface as disclosed in Patent Literature 1, the resin covering layer is prone to peeling off from the stator surface due to external forces such as vibration and centrifugal force.

The present invention has been made in view of the above-described circumstances, and provides a rotary electric machine capable of suppressing peeling of a resin covering layer for reducing windage loss.

Solution to Problem

One aspect of the present invention is a rotary electric machine provided with a rotor and a stator. One of the rotor and the stator has a groove portion formed on a circumferential surface facing the other of the rotor and the stator and extending in a direction that intersects with a circumferential direction, and a covering portion made of resin that covers the groove portion. The groove portion comprises a retention portion in which the groove width at a second position, farther in the radial direction from the opening than the first position, is wider than the groove width at the first position. The retention portion engages with the resin material that has been filled in the groove portion, thereby preventing removal of the covering portion.

The above-described groove portion may be formed at a tip end of a tooth portion of the stator, and the covering portion may be formed across the entire circumference on the inner peripheral side of the stator. In addition, the resin material of the covering portion may further cover the interior of the slots in the stator and insulate the coils disposed in the slots from the stator. Furthermore, the slots may include a flow passage for flowing a cooling medium at an outer-radial side of the coils.

The above-described groove portion may be formed on the outer periphery of the rotor, and the covering portion may cover at least the groove portion of the outer peripheral surface of the rotor.

Advantageous Effects of Invention

According to one aspect of the present invention, a rotary electric machine capable of suppressing peeling of a resin covering layer for reducing windage loss can be provided.

DESCRIPTION OF EMBODIMENTS

Figure 1:
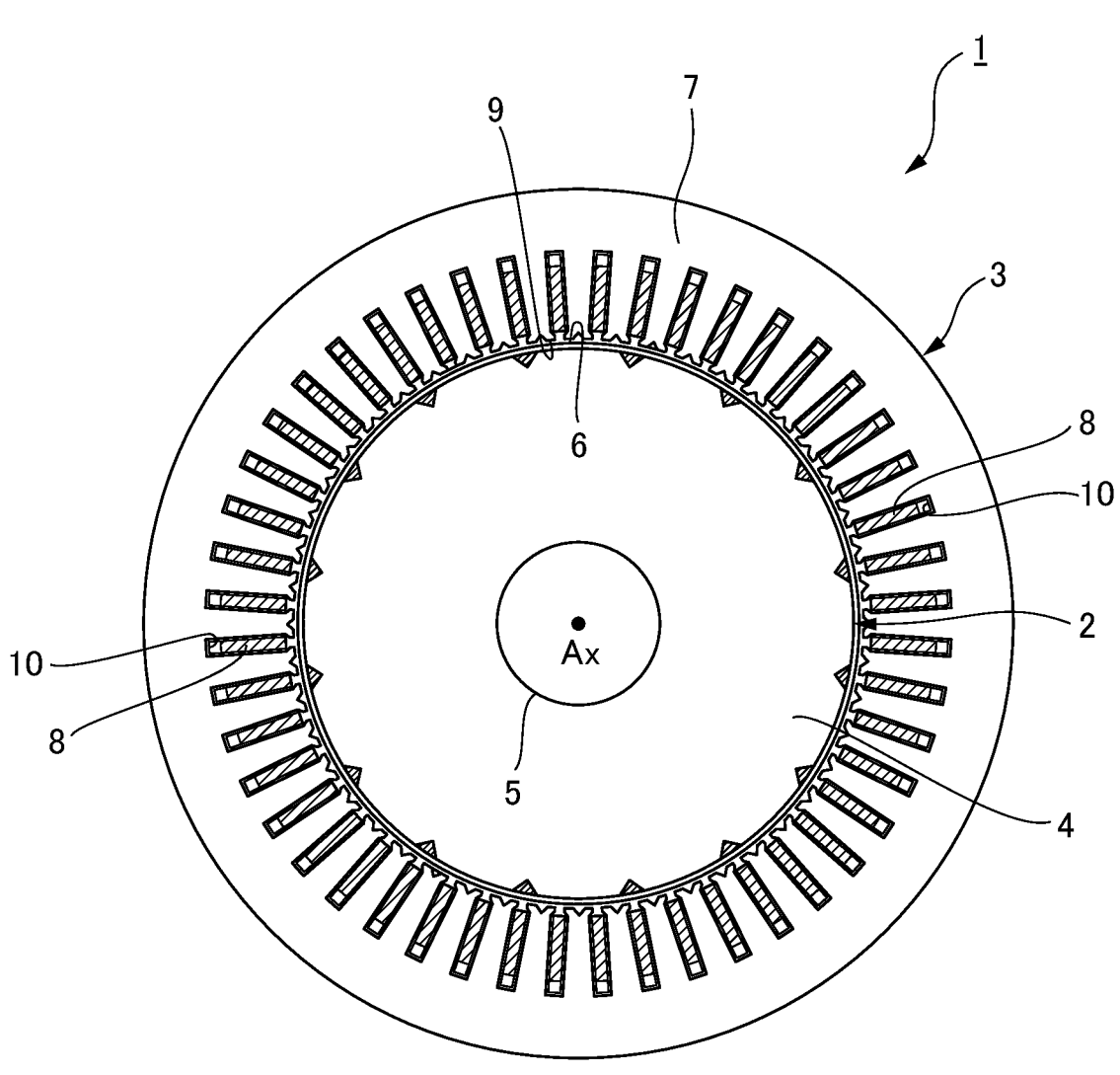
FIG. 1 is a diagram showing a configuration example of a rotary electric machine according to the present embodiment.

Hereinafter, an embodiment of the present invention will be described with reference to the drawings. In the embodiment, structures and elements other than the main part of the present invention will be described in a simplified or omitted manner in order for easy understanding. Further, the same elements are denoted by the same reference signs in the drawings. Note that shapes, dimensions, and the like of the respective elements illustrated in the drawings are schematically illustrated, and do not indicate actual shapes, dimensions, and the like.

In the following description, a direction parallel to an extension direction of a rotation axis Ax is referred to as an axial direction, a circumferential direction centered on the rotation axis Ax is simply referred to as the circumferential direction, and a radial direction centered on the rotation axis Ax is simply referred to as the radial direction. Further, in the following description, "extending in the axial direction" includes not only a case in which extension is strictly in the axial direction but also a case in which extension is in a direction that is inclined within a range less than 45° with respect to the axial direction. In addition, in the present specification, "extending in the radial direction" includes not only a case in which extension is strictly in the radial direction, that is, a direction orthogonal to the axial direction, but also a case in which extension is in a direction that is inclined within a range less than 45° with respect to the radial direction. In addition, "parallel" includes not only a case in which two directions are strictly parallel but also a case in which two directions form an angle that is within a range less than 45° with respect to each other.

Figure 2:
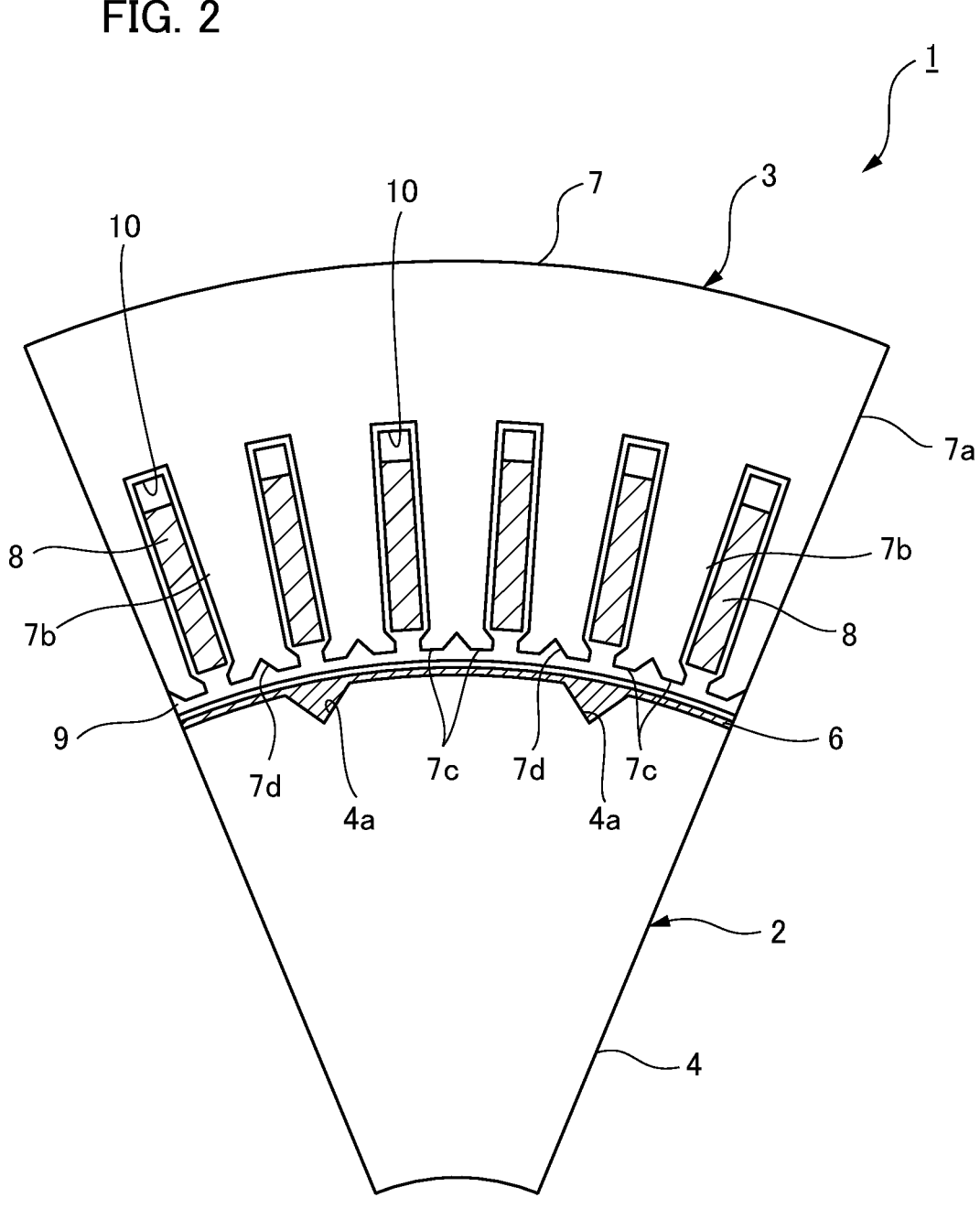
FIG. 2 is a partial enlarged view of FIG. 1.

FIG. 1 is a diagram showing a configuration example of a rotary electric machine according to the present embodiment. FIG. 2 is a partial enlarged view of FIG. 1. FIG. 1 and FIG. 2 show a cross section in a direction orthogonal to the rotation axis Ax in the rotary electric machine.

A rotary electric machine 1 shown in FIG. 1 is an inner rotor type motor that is applied to, for example, a vehicle motor. The rotary electric machine 1 includes a rotor 2 and a cylindrical-shaped stator 3 arranged on an outer periphery of the rotor 2. In FIG. 1 and FIG. 2, an extension direction of the rotation axis Ax of the rotary electric machine 1 is a direction perpendicular to the paper surface.

The rotor 2 is, for example, an embedded permanent magnet rotor or a surface permanent magnet rotor. The rotor 2 includes a rotor core 4 that is configured by laminating a plurality of electromagnetic steel sheets in the axial direction so as to have an overall cylindrical shape. A plurality of permanent magnets (not shown) are arranged in the rotor core 4 such that main magnetic poles are formed at equal intervals along the circumferential direction. In addition, at the center of the rotor core 4, a shaft 5 is inserted so as to penetrate the rotor core 4 in the axial direction along the rotation axis Ax. The shaft 5 is pivotally supported by bearings (not shown).

On the outer periphery of the rotor core 4, grooves 4a extending in the axial direction are formed to reduce torque ripple. A plurality of grooves 4a are formed in parallel at equal intervals in the circumferential direction of the rotor 2. Note that the plurality of grooves 4a may be formed in a skewed manner so as to be inclined with respect to the axial direction.

In addition, a rotor covering layer 6 made of resin is formed on the outer periphery of the rotor core 4. The rotor covering layer 6 includes a function of covering an outer peripheral surface and a plurality of grooves 4a of the rotor core 4 and filling gaps of the plurality of grooves 4a so as to make an outer peripheral surface of the rotor 2 a uniform circle when viewed from the axial direction. The rotor covering layer 6 is formed of, for example, thermosetting resin and is a non-magnetic material that allows magnetic flux to pass therethrough.

The stator 3 houses the rotor 2 in a central space portion centered on the rotation axis Ax. That is, the stator 3 is arranged concentrically around the rotor 2 with a slight air gap.

The stator 3 includes a stator core 7, coils 8, and a stator covering layer 9 made of resin. The stator core 7 is formed by laminating a plurality of electromagnetic steel sheets, punched into a shape shown in FIG. 1 in the axial direction. The stator core 7 has a yoke portion 7a formed over the entire circumference in the circumferential direction on the radially outer side and a plurality of tooth portions 7b extending radially inward from the inner peripheral side of the yoke portion 7a.

The plurality of tooth portions 7b are provided in a row at equal intervals in the circumferential direction. In addition, between adjacent tooth portions 7b, respective slots are formed. In each slot, coils 8 are installed along the outer periphery of the rotor 2, for example, using distributed winding or concentrated winding. Thereby, magnetic poles are formed at equal intervals along the circumferential direction by the coils 8 in the stator 3. In the rotary electric machine 1, by sequentially switching the magnetic field of the stator 3 via current control of the coils 8, an attractive force or repulsive force with the magnetic field of the stator 3 is generated in the rotor 2. Thereby, the rotor 2 rotates about the rotation axis Ax, driving the rotary electric machine 1.

In addition, as shown in FIG. 2, flange portions 7c, which extend on both sides in the circumferential direction, are formed at the tip ends of the tooth portions 7b positioned on the radially inner side. Furthermore, grooves 7d that extend in the axial direction are formed on the surface facing the outer periphery of the rotor 2 at the tip end of the tooth portions 7b for reducing torque ripple.

The stator covering layer 9 is a resin layer that covers the tip ends of the tooth portions 7b of the stator core 7 and each slot, and is formed from a resin material (for example, a thermosetting resin) that has insulating properties and is a non-magnetic material. Note that the resin material of the stator covering layer 9 may be the same as or different from the resin material of the rotor covering layer 6.

As shown in FIG. 2, the stator covering layer 9 is formed annularly over the entire circumference in the circumferential direction at a radially inner position of the stator 3. Specifically, at the radially inner side of the stator 3, the tip ends of the tooth portions 7b and gaps between adjacent tooth portions 7b are covered by the stator covering layer 9. Then, the inner peripheral surface of the stator 3 that faces the outer periphery of the rotor 2 is formed into a uniform circle by the stator covering layer 9 when viewed from the axial direction.

Thereby, recessed portions of the slots and grooves 7d at tip ends of the tooth portions 7b on the inner periphery of the stator 3 are filled with the resin material of the stator covering layer 9, and are not exposed to the outer side, and the inner peripheral surface of the stator 3 becomes uniform in the circumferential direction by the stator covering layer 9. In addition, by covering the entire circumference on the inner peripheral side of the stator 3 with the stator covering layer 9, formation of resin burrs at positions of the recessed portions of the slots is also suppressed.

In addition, inside the slots, the stator covering layer 9 covers the surfaces of the tooth portions 7b and the surfaces of the yoke portion 7a in the form of a thin film. Thereby, the stator covering layer 9 inside the slots has a function of insulating between the stator core 7 and the coils 8. Furthermore, in each slot, a gap 10 having a predetermined length in the radial direction is provided between the coils 8 and the yoke portion 7a. The gap 10 between the coils 8 and the yoke portion 7a extends in the axial direction and penetrates the stator 3, and functions as a flow passage for flowing a cooling medium (for example, oil) for cooling the coils 8 in the axial direction of the stator 3.

Figure 3:
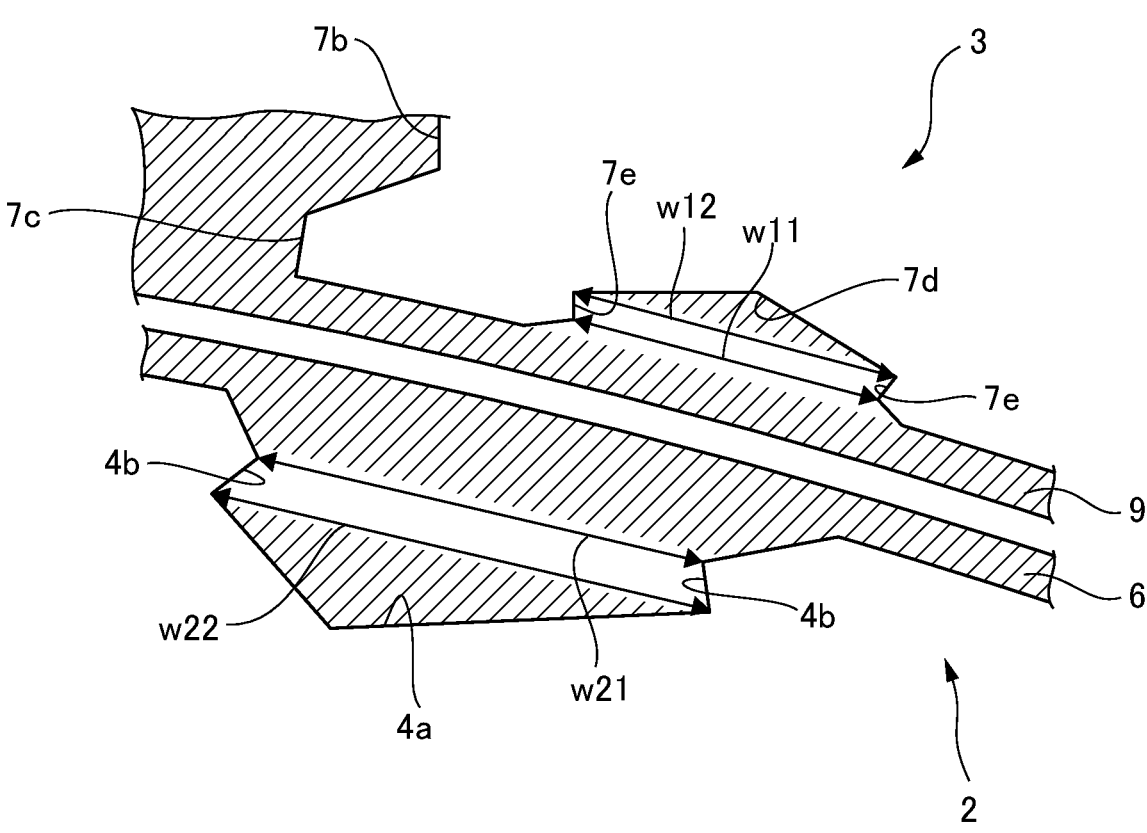
FIG. 3 is an enlarged view of a portion enclosed by broken lines in FIG. 2.

FIG. 3 is an enlarged view of a region enclosed by broken lines in FIG. 2. A groove 7d formed in the stator 3 is filled with the resin material of the stator covering layer 9. In a cross section perpendicular to the axial direction, the groove 7d has a retention portion 7e in which a groove width w12 at a second position on the outer-radial side, located farther from the opening than a first position, is formed wider than a groove width w11 at the first position on the inner-radial side (w11<w12), wherein the groove width w11 is a width in a direction perpendicular to the radial direction. Therefore, when an external force pulling toward the inner-radial side is applied to the stator covering layer 9, the resin material of the retention portion 7e is engaged at the first position, having a narrow groove width, and resists the force in the pulling direction. Thus, due to the retention portion 7e of the groove 7d, the stator covering layer 9 becomes difficult to peel off from the inner peripheral side of the stator 3.

Similarly, a groove 4a formed in the rotor 2 is filled with the resin material of the rotor covering layer 6. In a cross section perpendicular to the axial direction, the groove 4a has a retention portion 4b in which a groove width w22 at a second position on the inner-radial side, located farther from the opening than a first position, is formed wider than a groove width w21 at the first position on the outer-radial side (width in direction perpendicular to radial direction) (w21<w22). Therefore, when an external force pulling toward the outer-radial side is applied to the rotor covering layer 6, the resin material of the retention portion 4b is engaged at the first position, having a narrow groove width, and resists the force in the pulling direction. Thus, due to the retention portion 4b of the groove 4a, the rotor covering layer 6 becomes difficult to peel off from the outer peripheral side of the rotor 2.

As described above, in the rotary electric machine 1 of the present embodiment, the stator 3 includes a groove 7*d* that is formed on the inner peripheral surface facing the rotor 2 and extends in the axial direction intersecting with the circumferential direction, and a stator covering layer 9 made of resin that covers the groove 7*d*. By the formation of the groove 7*d*, torque ripple in the rotary electric machine 1 is suppressed, the inner peripheral surface of the stator 3 becomes uniform in the circumferential direction due to the stator covering layer 9, and windage loss caused by the groove 7*d* and slots is suppressed. In addition, the groove 7*d* includes a retention portion 7*e* that is formed such that a groove width w12 at a second position is wider than a groove width w11 at the first position, wherein the second position is separated from an opening in the radially outward direction farther than the first position. The retention portion 7*e* engages with the resin material that is filled in the groove 7*d* so as to prevent removal of the stator covering layer 9. Thereby, peeling of the stator covering layer 9, which is for reducing windage loss, is suppressed.

In addition, the rotor 2 includes a groove 4*a* that is formed on an outer peripheral surface facing the stator 3 and extends in the axial direction intersecting with the circumferential direction, and a rotor covering layer 6 made of resin that covers the groove 4*a*. Formation of the groove 4*a* suppresses torque ripple of the rotary electric machine 1, the outer peripheral surface of the rotor 2 becomes uniform in the circumferential direction by the rotor covering layer 6, and windage loss caused by the groove 4*a* is suppressed. In addition, the groove 4*a* includes a retention portion 4*b* that is formed such that a groove width w22 at a second position is wider than a groove width w21 at the first position, wherein the second position is separated from an opening in the radially inward direction farther than the first position. The retention portion 4*b* engages with the resin material that is filled in the groove 4*a* so as to prevent removal of the rotor covering layer 6. Thereby, peeling of the rotor covering layer 6, which is for reducing windage loss, is suppressed.

The present invention is not limited to the above-described embodiment, and various improvements and design changes may be implemented within a scope that does not depart from the spirit of the present invention. For example, although the above-described embodiment explains a case in which the rotary electric machine 1 is a motor, the rotary electric machine 1 may be a generator.

The above-described embodiment explained an example in which grooves having retention portions are formed in each of the rotor 2 and the stator 3. However, grooves having retention portions may be formed in either one of the rotor 2 or the stator 3. Furthermore, in the rotor 2 and the stator 3, a portion of the grooves in the circumferential direction may have retention portions, and not all grooves are required to have retention portions.

In addition, the rotor covering layer 6 that is formed on the rotor 2 may be formed partially at positions corresponding to the grooves 4*a* in the circumferential direction of the rotor core 4.

In addition, the shape of a groove having a retention portion is not limited to the above-described embodiment and the example in FIG. 3. For example, a cross-sectional shape of the groove perpendicular to the axial direction may have a wedge shape, wherein the groove width is wider at the deep portion and gradually becomes narrower toward the opening. Furthermore, the cross-sectional shape of the groove need not be linearly symmetric with respect to the radial direction, and for example, a part protruding toward the inner side may be formed on only one side of the groove.

Furthermore, the embodiment disclosed herein should be considered illustrative and not restrictive in all respects. The scope of the present invention is indicated not by the above description but rather by the claims, and all modifications within the meaning and scope equivalent to the claims are intended to be encompassed thereby.

REFERENCE SIGNS LIST

1 ROTARY ELECTRIC MACHINE
2 ROTOR
3 STATOR
4 ROTOR CORE
4*a* GROOVE
4*b* RETENTION PORTION
5 SHAFT
6 ROTOR COVERING LAYER
7 STATOR CORE
7*a* YOKE PORTION
7*b* TOOTH PORTION
7*c* FLANGE PORTION
7*d* GROOVE
7*e* RETENTION PORTION
8 COILS
9 STATOR COVERING LAYER
10 GAP

The invention claimed is:

1. A rotary electric machine comprising a rotor and a stator, wherein each of the rotor and the stator include:
   a groove portion that is formed on a circumferential surface and extends in a direction that intersects with a circumferential direction, and
   a covering portion made of resin that covers the groove portion, wherein
   the groove portion includes a retention portion that is formed such that a groove width at a second position is wider than a groove width at a first position, wherein the second position is separated in a radial direction from an opening farther than the first position, and wherein a groove width at the opening is wider than the groove width at the first position and the groove width at the second position, and
   the retention portion is configured to prevent removal of the covering portion by engaging with resin material that is filled in the groove portion.

2. The rotary electric machine according to claim 1, wherein
   the groove portion is formed at a tip end of a tooth portion of the stator, and
   the covering portion is formed over the entire circumference on an inner peripheral side of the stator.

3. The rotary electric machine according to claim 2, wherein
   the resin material of the covering portion further covers an inside of slots of the stator and insulates coils disposed in the slots from the stator.

4. The rotary electric machine according to claim 3, wherein
   the slots include a flow passage for flowing a cooling medium at an outer-radial side of the coils.

5. The rotary electric machine according to claim 2, wherein
   the tooth portion is a first tooth portion,
   the rotary electric machine further comprises a second tooth portion, and
   a slot is formed circumferentially between the first tooth portion and the second tooth portion.

6. The rotary electric machine according to claim 5, wherein the grooves of the stator are formed circumferentially adjacent to the slot.

7. The rotary electric machine according to claim 1, wherein the covering portion is a first covering portion that covers the groove portion of the rotor, and the rotary electric machine further comprises a second covering portion that covers the groove portion of the stator, the second covering portion being different from the first covering portion.

8. The rotary electric machine according to claim 1, wherein the covering portion is a first covering portion that covers an entire exterior circumference of the rotor, and the rotary electric machine further comprises a second covering portion that covers an interior circumference of the stator.

\* \* \* \* \*